Jan. 24, 1967     C. L. BOUCHARD     3,299,629
ENGINE INTAKE MANIFOLD AIR DRIVEN COMPRESSOR
Filed Dec. 22, 1964     3 Sheets-Sheet 1

CONSTANT L. BOUCHARD
INVENTOR

BY John R. Faulkner
Robert E. McCollum
ATTORNEYS

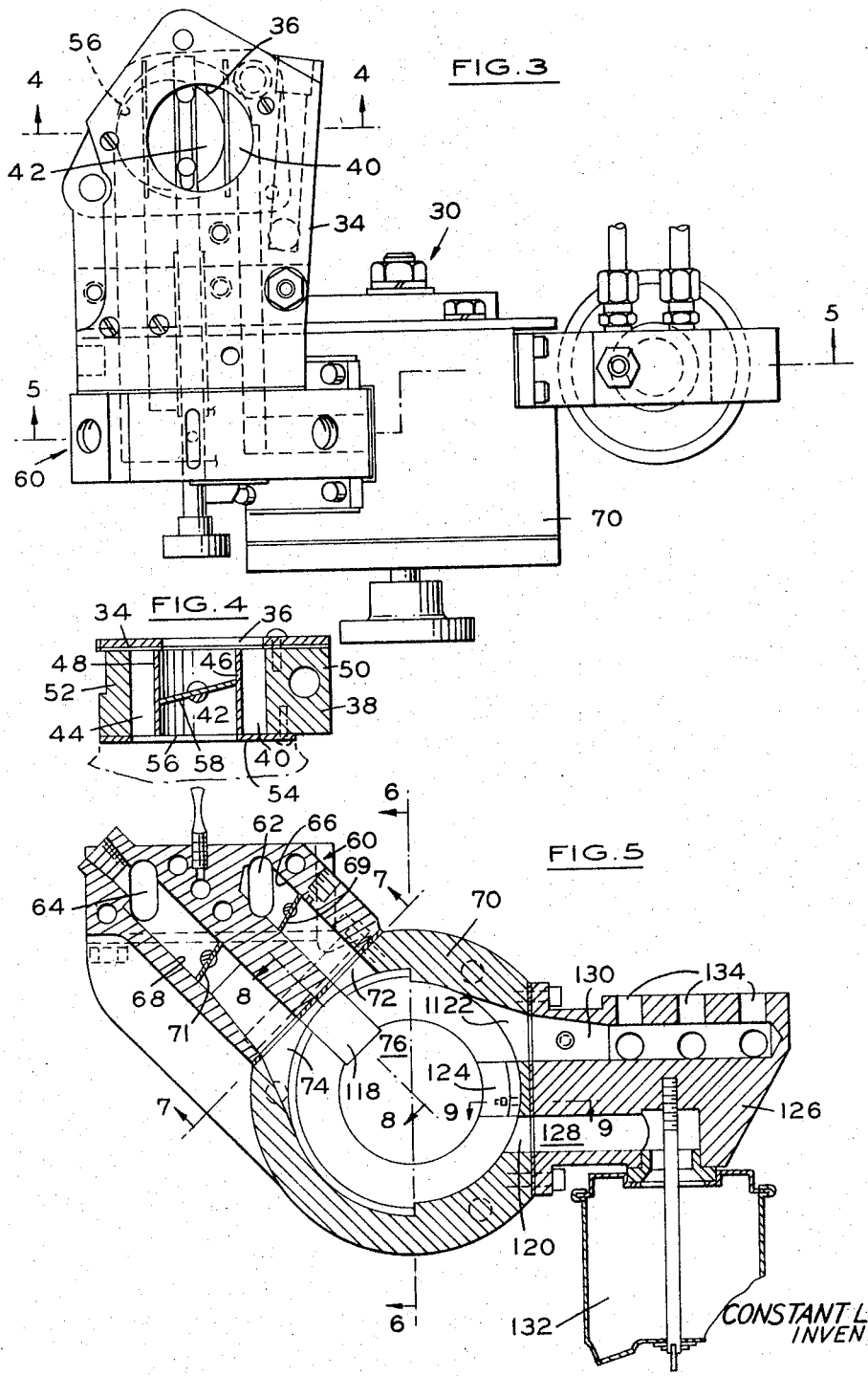

Jan. 24, 1967  C. L. BOUCHARD  3,299,629
ENGINE INTAKE MANIFOLD AIR DRIVEN COMPRESSOR
Filed Dec. 22, 1964  3 Sheets-Sheet 3

CONSTANT L. BOUCHARD
INVENTOR

BY John R. Faulkner
Robert E. McCollum
ATTORNEYS

United States Patent Office 3,299,629
Patented Jan. 24, 1967

3,299,629
ENGINE INTAKE MANIFOLD AIR DRIVEN
COMPRESSOR
Constant L. Bouchard, Birmingham, Mich., assignor to Ford Motor Company, Dearborn, Mich., a corporation of Delaware
Filed Dec. 22, 1964, Ser. No. 420,305
2 Claims. (Cl. 60—30)

This invention relates to an internal combustion engine for a motor vehicle. More particularly, it relates to an engine having means for reducing smog.

Many methods, schemes and devices have been proposed for eliminating smog. One of these proposes injecting a small amount of fresh air into each of the exhaust ports of the engine to oxidize the smog producing elements. The air is provided by a compressor that in substantially all of the cases is a self-contained unit mounted as an accessory on the engine and driven by the engine crank shaft. This not only reduces the useful power of the engine, but occupies useful space in the engine compartment, and is an expensive item.

This invention relates to an internal combustion engine having a turbo-compressor in the intake manifold driven by the flow of air-fuel mixture therein. This substantially reduces the cost of manufacture, saves space, and eliminates the usual belt or gear drive trains associated with an accessory mounted compressor.

One of the objects of the invention, therefore, is to provide an internal combustion engine with means that will provide a source of fresh clean air in a specified amount and at a specified pressure for injection into the engine exhaust ports to control smog.

Another object of the invention is to provide an internal combustion engine having a smog control device that provides no appreciable decrease in engine power output due to its installation and operation.

A further object of the invention is to provide an internal combustion engine with a smog control device that is relatively inexpensive, is compact in size, and is easily installed as a part of the engine.

It is also an object of the invention to provide an internal combustion engine with a turbo-compressor unit installed in the intake manifold whereby the unit utilizes the flow induced by the pressure drop between ambient and cylinder inlet pressures for providing rotative power to a turbine to drive a compressor and provide a source of fresh air to the exhaust ports of the engine for smog control purposes.

Other objects, features and advantages of the invention will become apparent upon reference to the succeeding, detailed description thereof, and to the drawings illustrating the preferred embodiment thereof; wherein:

FIGURE 3 is a cross-sectional view taken on a plane indicated by and viewed in the direction of the arrows 3—3 of FIGURE 2;

FIGURES 4 and 5 are cross-sectional views taken on planes indicated by and viewed in the direction of the arrows 4—4 and 5—5 of FIGURE 3; and FIGURES 6 through 9 are cross-sectional views taken on planes indicated by and viewed in the direction of the arrows 6—6, 7—7, 8—8 and 9—9 of FIGURE 5.

Figure 1:
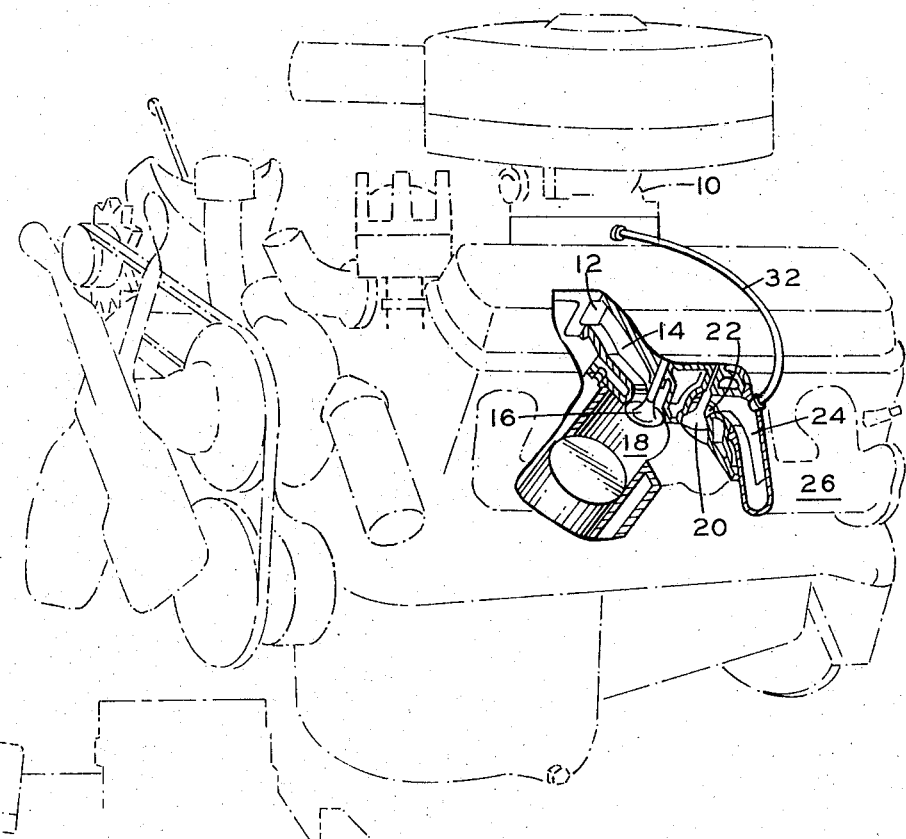
FIGURE 1 is a perspective view in phantom of an internal combustion engine, with parts broken away and in section.

FIGURE 1 illustrates in phantom a typical eight cylinder V-type internal combustion engine in which the invention is embodied. The engine includes a downdraft carburetor 10 through which an air-fuel mixture is inducted into intake manifolding 12. The manifolding is connected by suitable ported passages 14 to the engine intake valves 16 for introduction into the combustion chambers 18. Suitable exhaust valves 20 and exhaust ports 22 connect to passageways 24 forming portions of an exhaust manifold 26.

Located in the intake manifold, in a manner to be described, is a turbo-compressor unit 30 (FIGURE 2) that provides a source of fresh air to a tube 32 (FIGURE 1) connected to each of the exhaust ports 22. The small amount of fresh air introduced into the exhaust ports in this manner oxidizes the smog producing elements in the combustion gases, thereby reducing the dangerous content of the exhaust gases.

Figure 2:
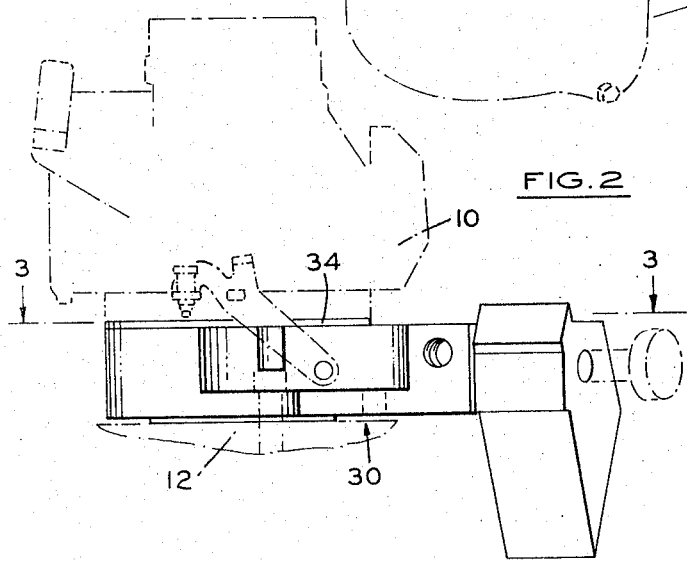
FIGURE 2 is an enlarged side elevational view of a detail of the FIGURE 1 showing.

FIGURE 2 shows the relative position of the turbo-compressor unit 30 with respect to carburetor 10 and the remaining portion of the intake manifolding 12. FIGURES 3 and 4 show a plate 34 secured to the bottom of the carburetor below the venturi (not shown) and having a circular opening 36 for the passage of an air-fuel mixture through it. The conventional butterfly valve is removed in this instance. Plate 34 forms the top of a rectangular box-like structure 38 divided into three longitudinal compartments 40, 42 and 44 by vertically extending partition means 46 and 48. The box-like structure is further defined by spaced side members 50 and 52 and a bottom plate 54. Plate 54 has a circular opening 56 offset with respect to opening 36 in plate 34. Plate 54 forms a portion of the conventional intake manifolding 12.

As best seen in FIGURE 4, the opening 36 in upper plate 34 directs fuel-air mixture only through passages 40 and 42. The opening 56 in the bottom plate to the intake manifold passages 14 is offset so as to receive fuel-air mixture only from the passages 42 and 44. A suitable throttle valve 58 is provided in passage 42 so that when it is closed, all of the air-fuel mixture is forced to flow through passage 40, such as, for example, during engine idling. When open, the portion of the fuel-air mixture passing through passage 42 passes directly into the intake manifolding through opening 56.

As best seen in FIGURES 3–5, box-like structure 38 is joined at its end to a diagonally disposed manifolding 60 that has air-fuel mixture inlet and outlet ports 62 and 64 aligned with passages 40 and 44. The ports 62 and 64 are intersected by a bore 66 and a tapered bore 68 in the body of manifolding 60 that constitute inlet and outlet passages, respectively, of the turbo-compressor unit 30 to be described. Both of the turbine inlet and exhaust passages 66 and 68 are controlled by suitable throttle valves 69 and 71 for varying the pressure differential and air flow through the turbine and manifolding in a manner providing optimum engine operation at all speed and load conditions.

Figure 6:
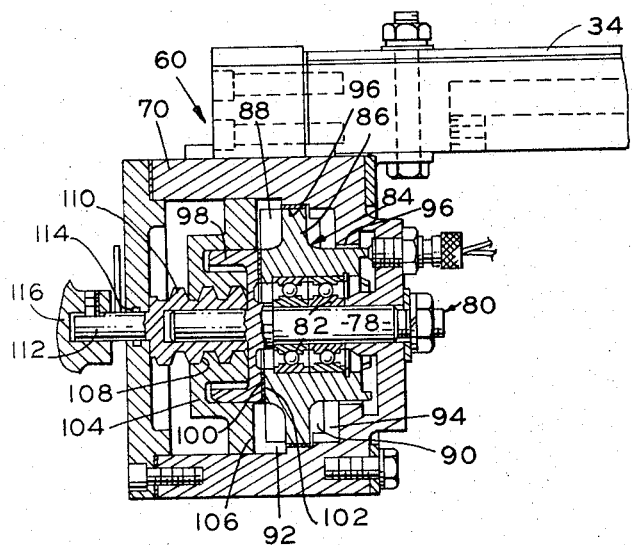
Figure 9:
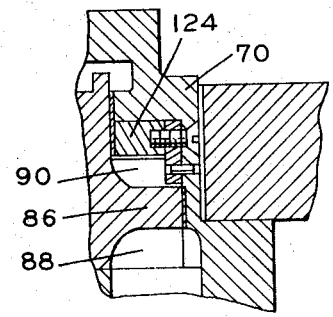
Figure 7:
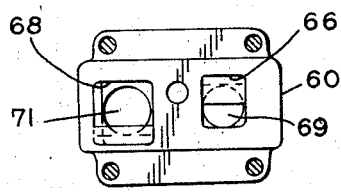

Secured to the lower portion of manifolding 60 is a substantially cylindrical stationary housing 70 having peripheral inlet and outlet passageways 72 and 74 connected to a central scroll-like cavity 76 in the housing. As best seen in FIGURE 6, the housing 70 contains a central shaft 78 that is held stationary by means of a nut and washer combination 80. Rotatably mounted on shaft 78 by bearings 82 is a wheel 84. It has a radially disposed portion 86 with flat outer edges.

Wheel 84 may be of molded plastic or other similar material. It is formed on one side with a plurality of circumferentially spaced steel turbine blades 88, and on its opposite side with a number of circumferentially spaced compressor blades 90 of smaller diameter. The surrounding portions of housing 70 are suitably formed to act as shrouds to provide turbine and compressor fluid flow chambers 92 and 94, as shown, and are provided with flock seals 96 in the running clearances between the housing shroud portions and adjacent portions of the wheel.

Shaft 78 is provided with a cup-shaped flange 98 that has a back face 100 further defining the turbine chamber. A flock seal 102 again is provided between the cooperating elements. The final side wall portion of the turbine chamber is defined by a control ring 104 that is nonrotatable but axially slidably mounted in the cavity in the housing on pins, not shown. The side 106 of control ring 104 partially defining turbine chamber 92 is shown as being tapered. This provides a diverging flow path around the periphery of the turbine to provide a constant peripheral velocity to the flow of the air-fuel mixture through it.

Control ring 104 is used to control the size of turbine chamber 92, and, therefore, the speed of rotation of the turbine to suit varying conditions of operation of the engine. The inner peripheral portion of the control ring is provided with a helical thread 108 cooperating with a screw 110 rotatably piloted on the end of shaft 78. It has a reduced stem portion 112 rotatably mounted in housing 70 and sealed by an O-ring 114. The stem extends outwardly of the housing to a rotatable control member 116 that can be manually or automatically controlled. It preferably would be operated by the vehicle accelerator pedal since the variable area control has functions similar to the carburetor butterfly valve. Rotation of control 116 causes control ring 104 to move axially along the shaft in either direction and, therefore, vary the size of turbine chamber 92.

Figure 8:
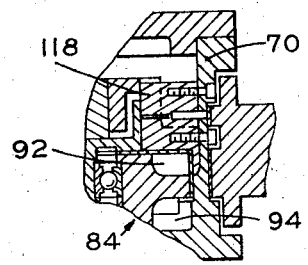

Returning to FIGURE 5, this latter figure shows to the left of section line 6—6 one-half of the turbine flow chamber 92, and to the right of the section line, one-half of the compressor chamber 94. As previously described, turbine chamber 92 has a peripheral inlet and outlet ports 72 and 74. They are separated by a block seal member 118. For clarity, the turbine blades have been omitted so that only the flow path is shown. FIGURE 8 shows the block seal in more detail. It is fixed to the housing 70 with only a running clearance between it and the turbine blades.

The turbo-compressor is of the drag type. That is, it operates by means of a drag or shearing relationship between the air or fluid flow and the turbine and compressor blades in a known manner.

During operation of the engine, the suction stroke causes a pressure differential to exist between the air taken into the carburetor and the air in the inlet to the cylinder, thereby inducing a flow of the air-fuel mixture through opening 36 in FIGURE 3. At engine idle, throttle valve 58 is closed, forcing all of the air-fuel mixture to flow into the turbine inlet passage 40 and intake port 62. The air-fuel charge then flows through passage 66 and port 72 and tangentially into the rotor chamber to stroke turbine blades 90. The kinetic energy of the air-fuel flowing against the blades causes a rotation of the turbine, the mixture filling the spaces between the blades and being carried around the turbine chamber. As the turbine wheel and blades rotate past the block seal 118, the air-fuel mixture is discharged into the tapered outlet port 74 and passage 68, and into passage 44 (FIGURE 4) that is connected to intake passages 14 (FIGURE 1).

Turning now to the compressor portion shown, in FIGURE 5 to the right of section line 6—6, the compressor chamber 94, like turbine chamber 92, is formed with a peripheral inlet port 120 and a tapered outlet port 122 separated by a block seal 124. The seal is shown in more detail in FIGURE 9. It is secured within housing 70 and has a running clearance with one edge of the compressor blades 90. The cylindrical housing 70 is connected to a rectangular-like manifolding 126 having suitable inlet and outlet passages 128 and 130. The inlet passage 128 is connected at its end to the outlet of an air filter 132 so that upon rotation of compressor blades 90, a supply of fresh air will be drawn through the air filter and passage 128 into the inlet 120 of the compressor. The compressor outlet passage 130 is intersected by eight (only three shown) cross passages 134, which are connected by separate tubes 32 (FIGURE 1) to the exhaust ports 22 of the engine. It will be clear, of course, that as many crossbores are provided as there are engine cylinders.

In operation of the compressor portion, rotation of turbine blades 88 and wheel 84 by the flow of air-fuel mixture against them causes a simultaneous rotation of compressor blades 90. This draws in a supply of fresh air through air filter 132 and passage 128 into the spaces between the compressor blades 90. This fresh air then is carried around the cylindrical path of the compressor chamber shown partially in FIGURE 5. As compressor blades 90 rotate past block seal 124, the fresh air is forced out through outlets 122 and 134 and into tubes 32 leading to the individual engine exhaust ports 22.

Above engine idle speeds, throttle valve 58 progressively opens to pass a portion of the fuel-air mixture directly into intake manifold passage 14 (FIGURE 1), the remaining portion passing into the inlet 62 to the turbine chamber 92. The size of turbine chamber 92, of course, is also controlled to improve turbine efficiency by moving the control ring 104 shown in FIGURE 6.

From the foregoing, it will be seen that the invention provides an engine construction that incorporates an air compressor in the intake manifold to be driven by the flow of air-fuel mixture against the blades of the turbine member, and that the rotation of the turbine simultaneously rotates compressor blades to supply fresh air to each of the engine exhaust ports for oxidizing the smog producing elements in the exhaust gases. It will be seen, therefore, that the engine not only provides a smog controlling device, but one that is self-contained and, therefore, is less expensive than a unit that is mounted as an accessory and driven by gearing or belts. It will furthermore be seen that the engine has a smog control device that is effective to control smog by providing clean air in a specified amount and at a specified pressure.

While the invention has veen illustrated in its preferred embodiment in the figures, it will be clear to those skilled in the arts to which the invention pertains that many changes and modifications may be made thereto without departing from the scope of the invention.

What is claimed is:

1. Compressed air supply means, comprising, in combination, an internal combustion engine having an air-fuel mixture carburetor, an intake manifold receiving said mixture during operation of said engine, and conduit means connecting said carburetor and manifold, said conduit means having a turbine-compressor unit therein, said turbine-compressor unit comprising a rotatable member having a set of turbine blades and a set of compressor blades rotatable with said member, means enclosing said member and dividing said sets of blades into separate sealed turbine and compressor compartments, said conduit means including a first conduit means connecting said air-fuel mixture to said turbine compartment to act against and rotate the blades and member therein and said compressor blades connected to said member, a second conduit means connecting the mixture discharged from said turbine blades to said intake manifold, a source of fresh air, said compressor compartment having an inlet connected to said source, an outlet for the discharge of air therethrough compressed by said compressor blades, and control means for adjusting the size of said turbine chamber to control the velocity of said mixture and thereby control the speed of rotation of said turbine.

2. Compressed air supply means, comprising, in combination, an internal combustion engine having an air-fuel mixture carburetor, an intake manifold receiving said mixture during operation of said engine, and conduit means connecting said carburetor and manifold, said conduit means having a turbine-compressor unit therein, said turbine-compressor unit comprising a rotatable member having a set of turbine blades and a set of compressor blades rotatable with said member, means enclosing said member and dividing said sets of blades into separate sealed turbine and compressor compartments, said conduit means including a first conduit connecting said air-fuel mixture to said turbine compartment to act against and rotate the blades and member therein and said compressor blades connected to said member, a second conduit connecting the mixture discharged from said turbine blades to said intake manifold, a source of fresh air, said compressor compartment having an inlet connected to said source, an outlet for the discharge of air therethrough compressed by said compressor blades, said conduit means having primary and secondary passages each receiving portions of the air-fuel mixture therein, said primary passage being connected at its opposite end to said first conduit, said secondary passage containing a throttle valve and being connected at its opposite end directly to said intake manifold, said throttle valve being closed during engine idling to pass all of said mixture into said primary passage and first conduit to said turbine chamber, said throttle valve being opened progressively above engine idle speed to discharge the said mixture through both of said passages.

References Cited by the Examiner
UNITED STATES PATENTS

| | | | |
|---|---|---|---|
| 1,815,097 | 7/1931 | Davidson | 123—119 X |
| 2,272,037 | 2/1942 | Horton | 60—11 |
| 3,147,588 | 9/1964 | Tauschek | 60—30 |

FOREIGN PATENTS

| | | |
|---|---|---|
| 483,217 | 7/1953 | Italy. |

References Cited by the Applicant
UNITED STATES PATENTS

| | | |
|---|---|---|
| 1,504,187 | 8/1924 | Fortier et al. |
| 2,936,714 | 5/1960 | Balje. |
| 3,116,596 | 1/1964 | Boehme et al. |

MARK NEWMAN, *Primary Examiner.*

RALPH D. BLAKESLEE, *Examiner.*